United States Patent
Chen et al.

(10) Patent No.: US 11,969,716 B2
(45) Date of Patent: Apr. 30, 2024

(54) SILICON CARBIDE (SIC)-LOADED GRAPHENE PHOTOCATALYST FOR HYDROGEN PRODUCTION UNDER VISIBLE LIGHT IRRADIATION AND PREPARATION THEREOF

(71) Applicant: Guangdong University of Technology, Guangzhou (CN)

(72) Inventors: Yun Chen, Guangzhou (CN); Shengbao Lai, Guangzhou (CN); Biao Li, Guangzhou (CN); Zuohui Liu, Guangzhou (CN); Guanhai Wen, Guangzhou (CN); Maoxiang Hou, Guangzhou (CN); Xin Chen, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/339,190

(22) Filed: Jun. 21, 2023

(65) Prior Publication Data

US 2023/0390746 A1    Dec. 7, 2023

(30) Foreign Application Priority Data

Jun. 23, 2022 (CN) .......................... 202210719106.1

(51) Int. Cl.
*B01J 27/224* (2006.01)
*B01J 6/00* (2006.01)
(Continued)

(52) U.S. Cl.
CPC ............. *B01J 27/224* (2013.01); *B01J 6/001* (2013.01); *B01J 21/18* (2013.01); *B01J 35/004* (2013.01);
(Continued)

(58) Field of Classification Search
CPC . B01J 27/224; B01J 6/001; B01J 21/18; B01J 35/004; B01J 37/04; B01J 37/06;
(Continued)

(56) References Cited

FOREIGN PATENT DOCUMENTS

| CN | 102886270 A |   | 1/2013 |   |
|----|-------------|---|--------|---|
| CN | 103834988 A | * | 6/2014 | ............... C30B 1/10 |

(Continued)

OTHER PUBLICATIONS

Pilar Miranzo et al. "In situ processing of electrically conducting graphene/SiC nanocomposites." Journal of the European Ceramic Society 33, pp. 1665-1674. (Year: 2013).*

(Continued)

*Primary Examiner* — Patricia L. Hailey

(57) ABSTRACT

This application discloses a silicon carbide (SiC)-loaded graphene photocatalyst for hydrogen production under visible light irradiation and a preparation method thereof. Pure SiC and pure black carbon are respectively prepared and mixed to obtain a mixture with a resistance less than 100Ω. Then the mixture was vacuumized and processed with a current pulse with an increasing voltage until a breakdown occurs, and subjected to ultrasonic stirring, centrifugal washing and vacuum drying in turn to obtain the SiC-loaded graphene photocatalyst. By means of the current pulse, a heterojunction is formed between SiC and graphene to improve the catalytic activity of the photocatalyst; and the photocatalytic hydrogen production rate of SiC nanoparticles can be enhanced after loaded on the graphene.

9 Claims, 5 Drawing Sheets

(51) Int. Cl.
  *B01J 21/18* (2006.01)
  *B01J 35/00* (2006.01)
  *B01J 37/04* (2006.01)
  *B01J 37/06* (2006.01)
  *B01J 37/08* (2006.01)
  *C01B 3/04* (2006.01)

(52) U.S. Cl.
  CPC ............... *B01J 37/04* (2013.01); *B01J 37/06* (2013.01); *B01J 37/08* (2013.01); *C01B 3/045* (2013.01)

(58) Field of Classification Search
  CPC ........ B01J 37/08; C01B 3/045; C01B 32/182; C01B 32/184; C01B 32/196
  USPC ...................................... 502/5, 178
  See application file for complete search history.

(56) References Cited

FOREIGN PATENT DOCUMENTS

| | | | | | |
|---|---|---|---|---|---|
| CN | 103878006 | A | * | 6/2014 | ............ B01J 27/24 |
| CN | 108493082 | A | | 9/2018 | |
| CN | 109999870 | A | | 7/2019 | |
| CN | 110182808 | A | | 8/2019 | |
| CN | 110354879 | A | | 10/2019 | |
| CN | 110354879 | A | * | 10/2019 | ............ B01J 27/224 |
| CN | 110433836 | | * | 11/2019 | ............ B01J 27/224 |
| CN | 110433836 | A | | 11/2019 | |
| CN | 112607731 | A | | 4/2021 | |
| CN | 112680195 | A | | 4/2021 | |
| CN | 113333773 | A | | 9/2021 | |
| EP | 2897921 | A4 | * | 12/2017 | ............ B82Y 30/00 |
| RU | 2681630 | | * | 3/2019 | ............ B82B 30/00 |
| RU | 2681630 | C1 | | 3/2019 | |
| WO | WO-2017069574 | A1 | * | 4/2017 | ............ C01B 31/26 |

OTHER PUBLICATIONS

Benito Román-Manso et al., "Electrically functional 3D-architectured graphene/SiC composites." Carbon 100, pp. 318-328. (Year: 2016).*
Javier Llorente et al., "Tribological performance under dry sliding conditions of graphene/silicon carbide composites." Journal of the European Ceramic Society 36, pp. 429-435. (Year: 2016).*
Kaixing Zhu et al., "Graphene covered SiC powder as advanced photocatalytic material." Applied Physics Letters 100, pp. 023113-1-023113-4. (Year: 2012).*
Jingjing Yang et al., "Photocatalytic water splitting to hydrogen production of reduced graphene oxide/SiC under visible light", Applied Physics Letters, vol. 102, No. 8, 083101.
Xunfu Zhou et al., "Ultra-thin SiC layer covered graphene nanosheets as advanced photocatalysts for hydrogen evolution", Journal of Materials Chemistry A, vol. 3, No. 20, Jan. 2012, p. 11,000, left column paragraph 4-right column paragraph 1.
Yunwei Wang et al., "Enhanced photocatalytic performance of chemically bonded SiC-graphene composites for visible-light-driven overall water splitting", international journal of hydrogen energy, vol. 38, No. 29, 2013, pp. 12733-12738.
Wenzhong Jiang Ed., "Carbon Graphite Products and Their Applications", Mar. 31, 2017, Metallurgical Industry Press, p. 238.
Maoqiang Li Ed., "Thermal ceramics, performance testing technology", Jun. 30, 2013, China Building Materials Industry Press, p. 271.

* cited by examiner

US 11,969,716 B2

SILICON CARBIDE (SIC)-LOADED GRAPHENE PHOTOCATALYST FOR HYDROGEN PRODUCTION UNDER VISIBLE LIGHT IRRADIATION AND PREPARATION THEREOF

CROSS-REFERENCE TO RELATED APPLICATIONS

This application claims the benefit of priority from Chinese Patent Application No. 202210719106.1, filed on Jun. 23, 2022. The content of the aforementioned application, including any intervening amendments thereto, is incorporated herein by reference in its entirety.

TECHNICAL FIELD

This application relates to photocatalysts, in particular to a silicon carbide (SiC)-loaded graphene photocatalyst for hydrogen production under visible light irradiation and a preparation method thereof.

BACKGROUND

It has become a global challenge to develop a new energy source to alleviate energy crisis and environmental pollution, so as to achieve the goals of low carbon, energy saving and emission reduction. Hydrogen energy has been considered as one of the most promising alternatives to fossil fuel due to its characteristics of pollution-free and high heating value.

Considerable attention has been paid to the use of a titanium dioxide ($TiO_2$)-based semiconductor as photocatalyst for photocatalytic hydrogen production in the past several years, and this catalyst has been demonstrated to have a certain application potential in the field of photocatalytic hydrogen production. However, $TiO_2$ itself has a wide forbidden band, and the forbidden band width of anatase $TiO_2$ is about 3.2 eV, which is much larger than the energy (1.23 eV) required for water splitting. Therefore, only ultraviolet (UV) light in the sunlight can stimulate the electrons of $TiO_2$ to jump up into the conduction band from the valence band, thus providing the energy required for the photocatalytic water splitting. In view of the low proportion (about 5%) of UV light in the sunlight, the $TiO_2$ has a poor utilization rate of sunlight, which greatly limits the application of $TiO_2$ as a photocatalyst. Therefore, it is urgently needed to develop a catalyst which can participate in the photocatalytic hydrogen production under visible light irradiation.

The forbidden band width and the positions of conduction and valence bands of silicon carbide (SiC) itself meet the requirement of photocatalytic water splitting, for instance, the β-SiC with a cubic microstructure has a forbidden band width of about 2.36 eV However, there are also some limitations in the application of SiC in the photocatalytic hydrogen production. Specifically, the photocatalytic activity of SiC is not high enough. Moreover, the carrier electrons and holes are prone to recombination, which is mainly affected by crystallinity and carrier mobility, where the defects appearing in the case of low crystallinity can easily serve as the carrier recombination centers, and the low carrier mobility will easily lead to the recombination of carriers before reaching the catalyst surface for catalytic reaction.

Considerable attempt has been made to modify SiC to improve the rate of photocatalytic hydrogen production from water, which is predominated by the doping of heavy metals (e.g., Au and Pt) and the addition of a cocatalyst (e.g., CdS and SiC). However, these approaches will introduce heavy metal ions, such as Au, Pt, and Cd, into the catalysts, bringing the risk of environmental pollution and environmental safety. In addition, the heavy metals are expensive, and thus are not suitable for the industrial production.

SUMMARY

An object of this application is to propose a silicon carbide (SiC)-loaded graphene photocatalyst for hydrogen production under visible light irradiation and a preparation method thereof to overcome the deficiencies in the prior art. SiC-loaded graphene is fabricated using a current pulse method, in which a heterojunction interfacial effect is formed between graphene and SiC, which can improve the catalytic activity of the photocatalyst. Furthermore, when SiC nanoparticles are loaded on the graphene, the layered graphene can improve the mobility of the SiC carriers, thereby inhibiting the carrier recombination to improve its photocatalytic hydrogen production efficiency.

To achieve the above purpose, this application adopts the following technical solutions.

In a first aspect, this application provides a method for preparing a SiC-loaded graphene photocatalyst for hydrogen production under visible light irradiation comprising:
  step (A) preparing a pure SiC;
  step (B) preparing a pure black carbon;
  step (C) mixing the pure SiC and the pure black carbon to obtain a mixture, wherein the mixture has a resistance less than 100 Ω;
  step (D) feeding the mixture to a current pulse processing equipment; and vacuumizing the current pulse processing equipment, and processing the mixture using a current pulse with an increasing voltage until a breakdown of the mixture; and
  step (E) subjecting the mixture to ultrasonic stirring, centrifugal washing and vacuum drying in turn to obtain the SiC-loaded graphene photocatalyst for hydrogen production.

In some embodiments, in step (D), the current pulse has a capacitance of 70-80 mF and a voltage of 120-180 V.

In some embodiments, step (A) specifically comprises:
  step (A1) calcining SiC powder followed by natural cooling to room temperature;
  step (A2) immersing the SiC powder obtained in step (A1) with a HF (hydrogen fluoride) solution under a sealed and light-proof condition; and
  step (A3) filtering an immersion system obtained in step (A2) to collect a filter residue, and subjecting the filter residue to washing with deionized water and vacuum drying to obtain the pure SiC.

In some embodiments, in step (A1), the SiC powder is calcined at 600-900° C. for 3-4 h;
  in step (A2), the HF solution has a HF content of 1-5% by weight; and
  in step (A3), the vacuum drying is performed at 50-90° C. for 3-4 h.

In some embodiments, step (B) comprises:
  calcining black carbon powder followed by natural cooling to room temperature to obtain the pure black carbon.

In some embodiments, the black carbon powder is calcined at 200-300° C. for 3-4 h.

In some embodiments, in step (E), the ultrasonic stirring is performed at 40-60° C. for 20-60 min.

In some embodiments, in step (E), the centrifugal washing is performed at 500-800 r/min for 30-40 min.

In some embodiments, in step (E), the vacuum drying is performed at 60-80° C. for 3-4 h.

In a second aspect, this application provides a SiC-loaded graphene photocatalyst for hydrogen production under visible light irradiation, which is prepared by the above method.

The technical solutions provided by embodiments of the present application may bring the following beneficial effects.

Regarding the preparation method provided herein, the SiC-loaded graphene photocatalyst is produced by processing a mixture of pure SiC and pure black carbon with current pulse, where a heterojunction will be formed between SiC and graphene to improve the catalytic activity. In addition, graphene has a high specific surface area and carrier mobility, such that it can enhance the mobility of SiC carriers after SiC is loaded thereon, which can effectively inhibit the SiC carrier recombination. The photocatalyst fabricated by the current pulse method has a significantly improved hydrogen production rate compared to the pure SiC, and the current pulse method has the advantages of high efficiency, low cost and simple operation, which can effectively reduce the difficulty of preparing photocatalysts.

DETAILED DESCRIPTION OF EMBODIMENTS

Figure 1:
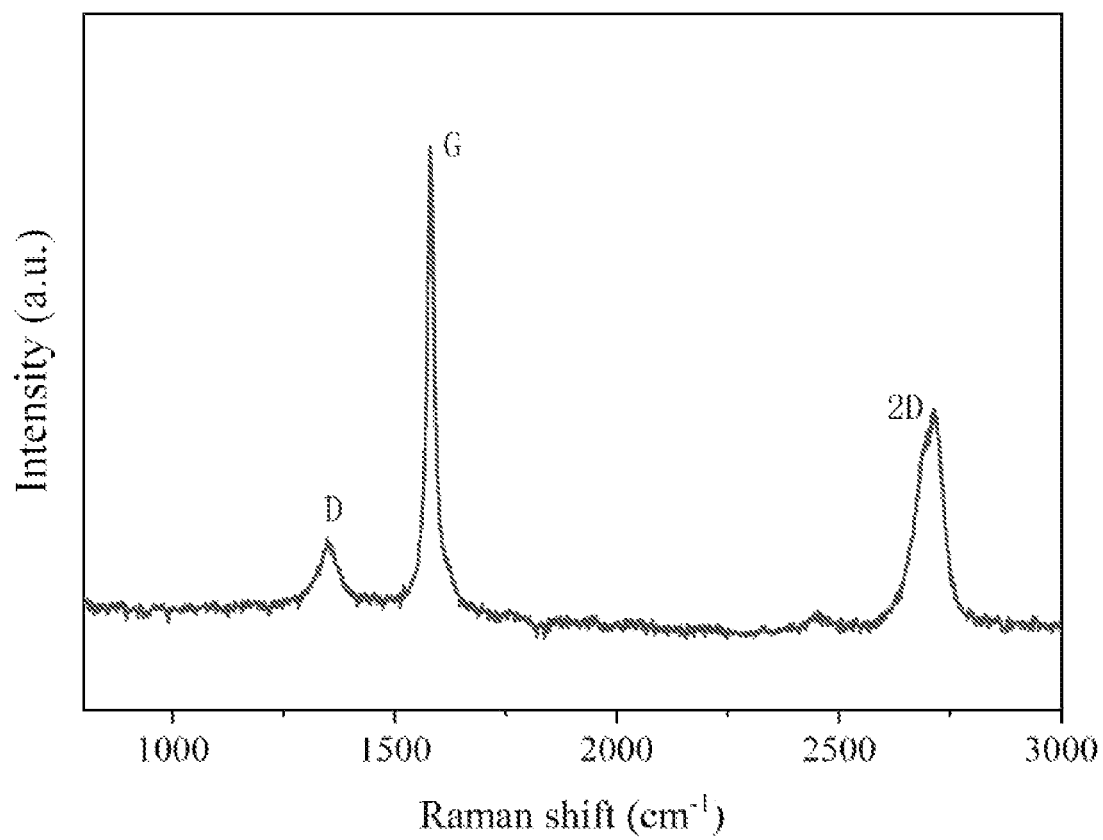
FIG. 1 is a Raman spectrum of the SiC-loaded graphene photocatalyst prepared by Example 1-1 of the present disclosure.

This application provides a preparation method of a silicon carbide (SiC)-loaded graphene photocatalyst for hydrogen production under visible light irradiation, including the following steps.

(A) Pure SiC is prepared.
(B) Pure black carbon is prepared.
(C) The pure SiC and the pure black carbon are mixed to obtain a mixture; where the mixture has a resistance less than 100Ω.
(D) The mixture is fed to a current pulse processing equipment; after vacuumizing the current pulse processing equipment, the mixture is processed using current pulse with a gradually increasing voltage until the mixture is completely broken down.
(E) The mixture is subjected to ultrasonic stirring, centrifugal washing and vacuum drying in turn to obtain the SiC-loaded graphene photocatalyst.

SiC has the following drawbacks for photocatalytic hydrogen production: first, SiC itself has low photocatalytic activity; second, crystallinity and carrier mobility are meant to be main factors since carrier electrons and holes are prone to recombining; where defects caused by low crystallinity tend to become carrier recombination centers, while low carrier mobility tends to lead to carriers recombination before carriers reach the catalyst surface for catalytic reaction.

To solve the above technical problems, the present application fabricates SiC-loaded graphene using current pulse to form a heterojunction interface effect between graphene and SiC, which improves the catalytic activity of photocatalyst. In addition, lamellate graphene has high carrier mobility and large specific surface area, such that when loaded SiC nanoparticles, lamellate graphene can improve the mobility of SiC carriers and thus inhibit carrier recombination, thereby improving photocatalytic hydrogen production efficiency thereof. This scheme provides a new solution for SiC-based photocatalytic hydrogen production from water under visible light irradiation by fabricating the SiC-loaded graphene photocatalysts via a current pulse method.

Specially, a preparation method of a SiC-loaded graphene photocatalyst for hydrogen production under visible light irradiation, includes the following steps.

Firstly, high-purity SiC and black carbon are prepared. Commonly-used SiC powders generally have carbon and oxide impurities. The existence of carbon impurity in SiC powder will affect the catalytic efficiency of the photocatalyst on the one hand; on the other hand, it will also affect the proportion of carbon doping in the mixture in the subsequent steps, thus making it difficult to control the resistance of the mixture. The oxide impurities in SiC powder generally refer to silica, same as the aluminum oxide film formed on the surface of aluminum adheres to the aluminum surface, the silicon dioxide attached to the SiC powder surface will wrap the SiC, thus affecting its catalytic reaction. And commonly used black carbon powder generally has excess moisture and sulfide. To ensure that the prepared photocatalyst is not interfered by other components, and to strictly control the doping ratio, pure SiC and pure black carbon are used as the raw photocatalyst materials in this scheme.

Then, the pure SiC and the pure black carbon are mixed to obtain a mixture with a resistance less than 100Ω. Since the current pulse processing method applied in this scheme requires the reactants to be conductive, too high resistance will also require higher capacitance and voltage during the current pulse processing. Therefore, in order to ensure the safety during the processing, the resistance of the mixture after mixing the pure SiC and the pure black carbon is limited to less than 100Ω in this application.

Since the current pulse tends to disperse the powder from impact when processing the powder. Therefore, in order to reduce the loss of raw materials of the pure black carbon and the pure SiC during processing. In this preferred scheme, the mixture is added with an appropriate amount of water, stirred to be sticky, and is subjected to current pulse processing, thus reducing the loss of the raw materials of the mixture powder.

Next, the mixture is fed to the current pulse processing equipment, vacuumed, and then is processed with a current pulse with a gradually increasing voltage until a complete breakdown of the mixture occurs. The current pulse processing method releases a high current through the reaction material, resulting in a current explosion and ablation that instantaneously generates a high temperature of up to approximately 2700 degrees Celsius. It causes the reactant to carbonize, while other trace elements vaporize and are removed through interstices, and carbon atoms reorganize to form the layered graphene.

In addition, the processing of the current pulse includes three main cases. First, when the capacitance or the voltage is insufficient, no reaction occurs. Second, when the capacitance and the voltage are appropriate, the reaction occurs accompanied by a dazzling orange glow; and the reactant is flowed by the current, the ground-state electrons of the reactant obtain energy and leap to the excited-state; the excited-state is unstable, easy to fall from the excited state to the sub-stable-state, and the excess energy is released in the form of light. Third, when the voltage and the capacitance are too large, the high current directly destroys the interior with a dropping resistance and causes perforation, accompanied by a dazzling blazing white glow.

Since the appropriate capacitance and voltage during the processing of the current pulse varies accordingly with different parameters such as the resistance and thickness of reactants. The current pulse with a gradually increasing voltage is used in this scheme to process the mixture until the mixture is completely broken down, which helps to make the preparation method more suitable for different mixtures, thus reducing the processing difficulty. The criteria for the complete breakdown of the mixture in this scheme are an instantaneous flash of incandescent white glow, a rapid drop of current to zero, and the holes in the mixture.

Finally, the above mixture is subjected to ultrasonic stirring, centrifugal washing and vacuum drying in turn to obtain the SiC-loaded graphene photocatalyst for hydrogen production under visible light.

Regarding the SiC-loaded graphene photocatalyst for hydrogen production under visible light, the SiC-loaded graphene photocatalyst is prepared by processing a mixture of pure SiC and pure carbon black using current pulse, where a heterojunction is formed between SiC and graphene, improving the catalytic activity. In addition, since graphene has a high specific surface area and carrier mobility, such that it can improve the mobility of SiC carriers when SiC is loaded thereon, and thus can effectively inhibit the SiC carrier recombination. The photocatalyst processed by the current pulse can significantly improve the hydrogen production rate compared to the pure SiC, and the current pulse method has the advantages of high efficiency, low cost and simple operation, which can effectively reduce the processing difficulty of preparing photocatalysts.

It is further noted that, in step (D), the current pulse has a capacitance of 70-80 mF and a voltage of 120-180 V.

Since the reaction is more difficult when the resistance of the mixture is higher or there are more raw materials. Appropriate current pulse parameters are preferably selected according to the resistance of the mixture in this scheme to ensure a successful processing.

Preferably, in step (D), the current pulse has a capacitance of 72 mF and a voltage of 140-160 V.

Stated further, step (A) specifically includes the following steps.

(A1) The SiC powder is calcined and naturally cooled to room temperature;

(A2) The SiC powder obtained in step (A1) is immersed with a HF (Hydrogen Fluoride) solution in a sealed and light-proof environment.

(A3) The immersion system obtained in step (A2) is filtered to collect a filter residue; and the filter residue is subjected to washing with deionized water and vacuum drying to obtain the pure SiC.

In a preferred embodiment of the present technical scheme, the pure SiC can be obtained by the purification of SiC powder. Specifically, the SiC powder is firstly calcined to remove the carbon impurity; and then the oxide impurities in the SiC powder are removed via the HF solution; and finally the pure SiC can be obtained followed by washing and drying. The purification of pure SiC in this scheme is simple and reliable, which facilitates the removal of impurities of carbon and oxides in the SiC powder to a greater extent, thus avoiding the influence of the impurities on the performance of photocatalysts.

Stated further, in step (A1), the SiC powder is calcined at 600-900° C. for 3-4 h;

in step (A2), the HF content of the HF solution is 1-5% by weight; and in step (A3), the vacuum drying is performed at 50-90° C. for 3-4 h.

Specifically, this scheme utilizes the high temperature of 600-900° C. to calcined the SiC powder for 3-4 h, which facilitates the reduction of the carbon impurities in SiC powder as much as possible. The silicon dioxide in the SiC powder can be removed using the HF solution with a HF content of 1-5% by weight, enhancing the removal rate of silicon dioxide while saving the HF solution.

Preferably, in step (A1), the SiC powder is calcined at 800° C. for 4 h;

in step (A2), the HF content of the HF solution is 3% by weight;

in step (A3), the vacuum drying is performed at 80° C. for 4 h.

Stated further, step (B) includes calcining the black carbon powder followed by natural cooling to room temperature to obtain the pure black carbon.

In another preferred embodiment of the present technical scheme, the pure black carbon can be obtained by purification of carbon black powder, which is simple and easy to operate. Specifically, the water in the black carbon powder is heated up and evaporated, while the sulfide is converted into sulfur dioxide gas during calcination, so that the water and sulfide in the black carbon powder can be removed at the same time.

Stated further, the black carbon powder is calcined at 200-300° C. for 3-4 h.

The calcination of the carbon black powder can effectively enhance the conversion of the sulfide while ensuring sufficient evaporation of the water from the carbon black powder.

Preferably, the black carbon powder is calcined at 250° C. for 4 h.

Still further, in step (E), the ultrasonic stirring is performed at 40-60° C. for 20-60 min.

Preferably, in step (E), the ultrasonic stirring is performed at 60° C. for 30 min.

Further, in step (E), the centrifugal washing is performed at 500-800 r/min for 30-40 min.

Preferably, in step (E), the centrifugal washing is performed at 600 r/min for 30 min.

Further, in step (E), the vacuum drying is performed at 60-80° C. for 3-4 h.

In this scheme, the mixture obtained from reaction is purified by ultrasonic stirring, centrifugal washing and vacuum drying, and the processing parameters related to the purification are preferably selected, avoiding the weakening of the related properties of the photocatalyst during the purification and ensuring the catalytic efficiency of the prepared photocatalyst.

Preferably, in step (E), the vacuum drying is performed at 80° C. for 4 h.

The SiC-loaded graphene photocatalyst is prepared by utilizing the above preparation method of the SiC-loaded graphene photocatalyst for hydrogen production under visible light irradiation.

The technical solutions of the present application will be further described below by means of specific embodiments.

Example 1 Preparation of a SiC-Loaded Graphene Photocatalyst for Hydrogen Production Under Visible Light Irradiation (A) The SiC powder was calcined at 800° C. for 4 h and naturally cooled to room temperature; then the SiC powder was immersed with a HF solution with 3% HF content by weight in a sealed and light-proof environment; and the immersion system was filtered to collect a filter residue; and the filter residue was subjected to washing with deionized water followed by vacuum drying at 80° C. for 4 h to obtain the pure SiC.

(B) The black carbon powder was calcined at 250° C. for 4 h and naturally cooled to room temperature to obtain the pure black carbon.

(C) The pure SiC and the pure black carbon were mixed according to the mixing ratio in Table 1 below to obtain the mixture with the corresponding resistance value.

(D) The mixture was fed into the current pulse processing equipment; and the equipment was vacuumized, and then the mixture was processed by the current pulse with a gradually increasing voltage until the complete breakdown of the mixture occurred; where the current pulse had a capacitance of 72 mF and a voltage of 140-160 V.

(E) The complete breakdown mixture was subjected to ultrasonic stirring, centrifugal washing and vacuum drying in turn to obtain the the SiC-loaded graphene photocatalyst, where the ultrasonic stirring was performed at 60° C. for 30 min; the centrifugal washing was performed at 600 r/min for 30 min; the vacuum drying was performed at 80° C. for 4 h.

TABLE 1

| Mixing ratio and resistance of mixtures in Examples 1-1, 1-2 and 1-3 | | | |
| --- | --- | --- | --- |
| Items | Example 1-1 | Example 1-2 | Example 1-3 |
| Mixing ratio (weight ratio of pure black carbon to pure SiC) | 1:4 | 1:6 | 1:8 |
| Resistance (Ω) | 15 | 25 | 32 |

Comparative Example 1 Preparation of a Silicon Carbide Photocatalyst

The SiC powder was calcined at 800° C. for 4 h, naturally cooled to room temperature and immersed with a HF solution with 3 wt. % HF in a sealed and light-proof environment. The immersion system was filtered to collect a filter residue, which was subjected to washing with deionized water and vacuum drying at 80° C. for 4 h to obtain the SiC photocatalyst.

Comparative Example 2 Preparation of a Composite Photocatalyst (A) The SiC powder was calcined at 800° C. for 4 h, naturally cooled to room temperature and immersed with a HF solution with 3 wt. % HF in a sealed and light-proof environment. The immersion system was filtered to collect a filter residue, which was then subjected to washing with deionized water and vacuum drying at 80° C. for 4 h to obtain the pure SiC.

(B) The black carbon powder is calcined at 250° C. for 4 h and naturally cooled to room temperature to obtain the pure black carbon.

(C) The pure SiC and the pure black carbon were mixed in a weight ratio of 1:4 to obtain a composite photocatalyst with a resistance of 15Ω.

FIG. 1 is Raman spectrum of the SiC-loaded graphene photocatalyst prepared by Example 1-1. The 2G-peak characterizing graphene can be seen in FIG. 1, which indicates that, in this scheme, graphene was generated by processing the black carbon and the SiC using the current pulse method. The D-peak of the defect peak is smaller compared to the G-peak characterizing graphene, indicating a better defect degree of graphene, i.e., the obtained graphene had fewer defects. And the defects of graphene can affect the carrier mobility on the graphene layer, as it is easy to form potential wells, allowing carriers to be trapped in and thus unable to play a catalytic role. And the graphene obtained in this embodiment had a better defect degree; when SiC was loaded on graphene, the high carrier mobility of graphene would be beneficial to the carrier migration of SiC, thus effectively reducing carrier recombination.

Figure 2:
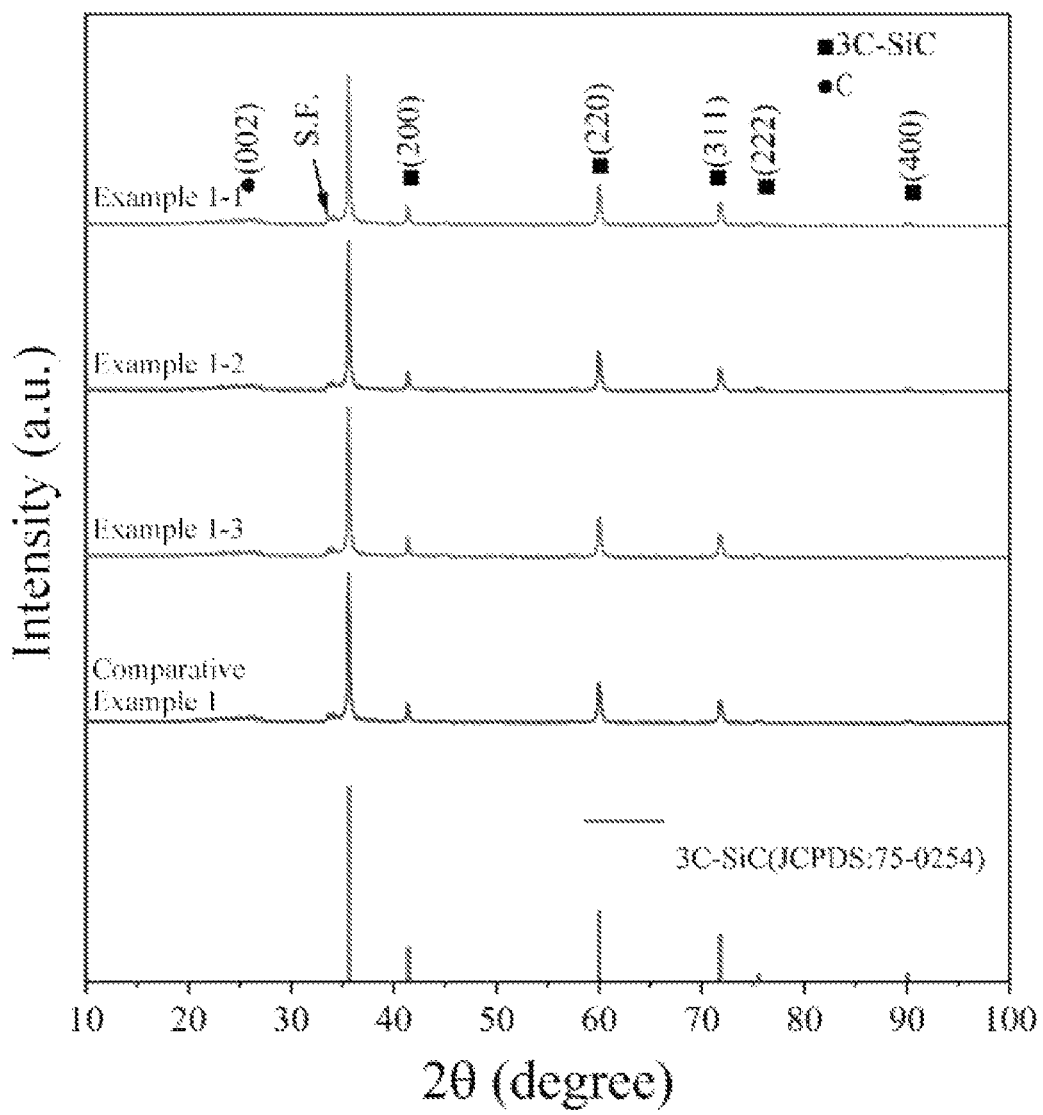
FIG. 2 is an X-ray diffraction (XRD) pattern of the photocatalysts prepared by Examples 1-1, 1-2 and 1-3 of the present disclosure and Comparative Example 1.

FIG. 2 shows X-ray diffraction (XRD) pattern of the photocatalysts prepared by Example 1 and Comparative Example 1. As can be seen from FIG. 2, the crystal structure of Example 1 was basically unchanged compared to that of Comparative Example 1. Therefore, it can be concluded that the black carbon or the graphene processed by the current pulse device barely affects the crystal structure of SiC.

Figure 3:
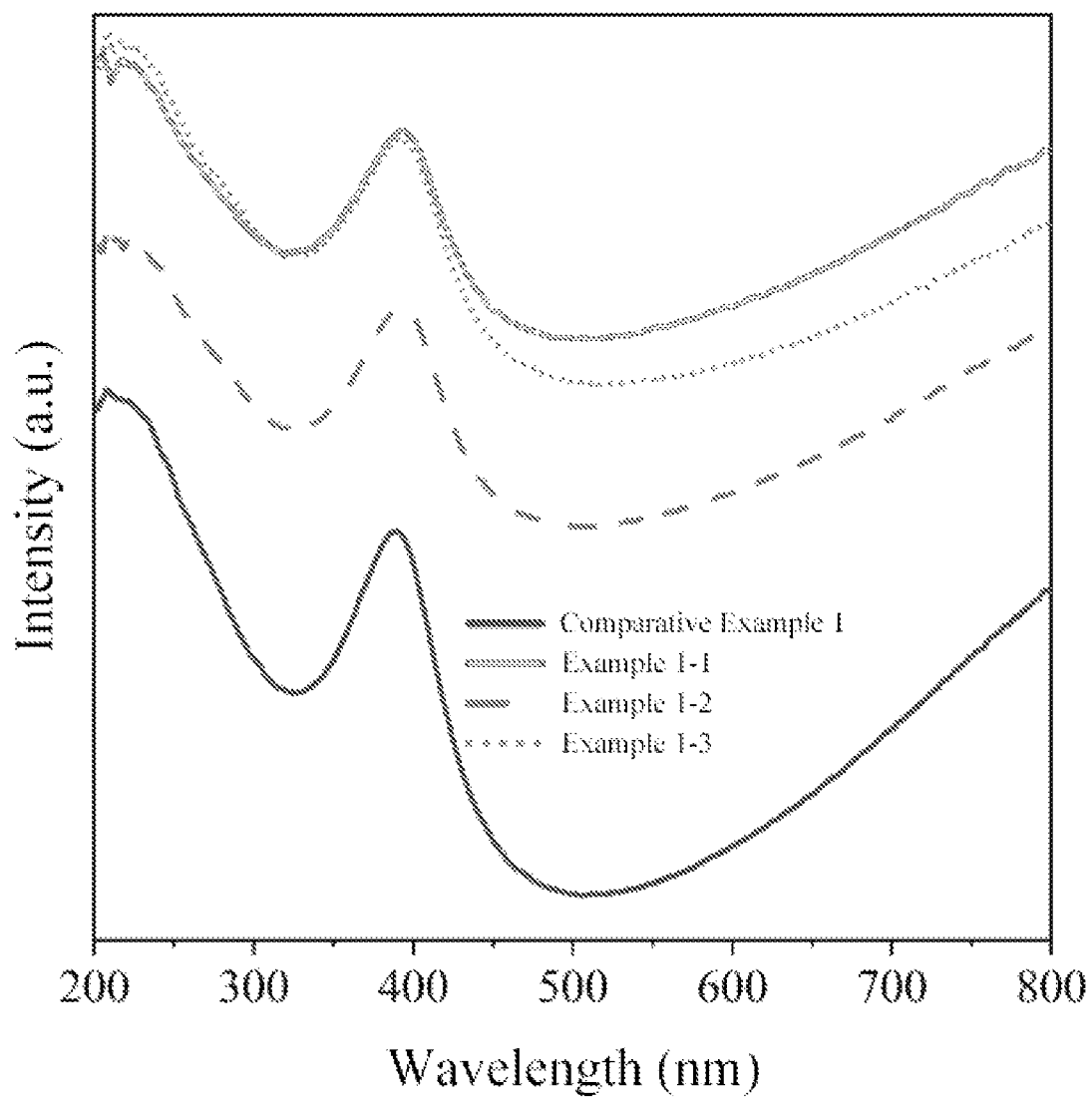
FIG. 3 shows ultraviolet-visible (UV-Vis) diffused reflection spectra of the photocatalysts prepared by Examples 1-1, 1-2 and 1-3 of the present disclosure and Comparative Example 1.

FIG. 3 shows ultraviolet-visible (UV-Vis) diffused reflection spectra of the photocatalysts prepared by Example 1 and Comparative Example 1. From FIG. 3, it can be seen that the photocatalysts in Example 1 was significantly more responsive to and absorbed more UV and visible light compared to the photocatalysts in Comparative Example 1. From the UV-Vis diffused reflection spectra, it appears that the graphene in Example 1 improved the responsiveness and absorption of light, which means that more light energy can be absorbed by the composite photocatalyst prepared in Example 1, and thus making it more easily to realize the leap to the valence band by absorbing enough energy.

Control Experiment 1 of Photocatalytic Hydrogen Production (1) A quartz reaction vessel containing 100 mL of deionized water was added with 0.05 mol of $9H_2O \cdot Na_2S$ and 0.05 mol of $Na_2SO_3$ as a sacrificial agent, and nitrogen gas was introduced into the reaction vessel to replace the gases therein.

(2) The nitrogen tank was switched on to provide carrier gas protection for the entire hydrogen production system. Subsequently, the gas chromatograph and the photocatalytic hydrogen production system were started, and the matched software in the computer was opened; and the program in the matched software was set to hydrogen production and the coil of the gas chromatograph was heated.

(3) The cooling water pipeline of the reaction vessel was connected, then the preset temperature of the cooling water was set to 5° C., and then the cooling water circulation was turned on; vacuum grease was evenly applied on the joint of the reaction vessel and the quartz pipeline of the photocatalytic hydrogen production system, and then the vacuum pump was turned on to vacuumize the system until the approximate pressure was near 1.3 kPa.

(4) The valves of the photocatalytic hydrogen production system were rotated, and the vacuum pump was turned off after the pressure inside the system was stabilized; the jump pump was turned on, which is beneficial for stirring the produced hydrogen homogeneously, and convenient for the gas chromatograph to detect accurately.

(5) The xenon lamp was preheated for 2 minutes, and then was turned on. The period of detecting hydrogen of the photocatalytic hydrogen production was set as 1 h (i.e., the gas chromatograph detects the content of hydrogen in the system once every one hour), and the circulation cycle was simultaneously set to 12. The experimental results demonstrated the occurrence of hydrogen.

From control experiment 1 of the photocatalytic hydrogen production, it can be obtained that under simulated sunlight (including ultraviolet (UV) and visible light), the sacrificial agent $9H_2O \cdot Na_2S + Na_2SO_3$ can produce hydrogen by itself, which will interfere with the detection of hydrogen production performance of photocatalysts in this scheme.

Control Experiment 2 of Photocatalytic Hydrogen Production (1) A quartz reaction vessel containing 100 mL of deionized water was added with 0.05 mol of $9H_2O \cdot Na_2S$ and 0.05 mol of $Na_2SO_3$ as a sacrificial agent; nitrogen gas was introduced into the reaction vessel to vent the gases therein.

(2) The nitrogen tank was switched on to provide carrier gas protection for the entire hydrogen production system. Subsequently, the gas chromatograph and the photocatalytic hydrogen production system were started, and the matched software in the computer was opened; and the program in the matched software was set to hydrogen production and the coil of the gas chromatograph was heated.

(3) The cooling water pipeline of the reaction vessel was connected, then the preset temperature of the cooling water was set to 5° C., and then the cooling water circulation was turned on; vacuum grease was evenly applied on the joint of the reaction vessel and the quartz pipeline of the photocatalytic hydrogen production system, and then the vacuum pump was turned on to vacuumize the system until the approximate pressure was near 1.3 kPa.

(4) The valves of the photocatalytic hydrogen production system were rotated, and the vacuum pump was turned off after the pressure inside the system was stabilized; the jump pump was turned on, which is beneficial for stirring the produced hydrogen homogeneously, and convenient for the gas chromatograph to detect accurately.

(5) The xenon lamp was preheated for 2 minutes, and then was turned on; and an UV cutoff filter was installed. The period of detecting hydrogen of the photocatalytic hydrogen production was set as 1 h (i.e., the gas chromatograph detects the content of hydrogen in the system once every one hour); simultaneously, the circulation cycle was set as 12. The experimental results demonstrated the absence of hydrogen.

To avoid the influence of the sacrificial agent $9H_2O \cdot Na_2S + Na_2SO_3$ on the detection of the hydrogen production performance of photocatalysts, an ultraviolet cutoff filter was installed in the control experiment 2 of photocatalytic hydrogen production of this scheme, while the other conditions were kept the same as that of the control experiment 1, thus excluding the interference of the hydrogen produced by the sacrificial agent itself on this experiment.

Experiment of Photocatalytic Hydrogen Production (1) Two hundred and fifty mg of photocatalysts obtained in examples 1-1, 1-2 and 1-3, and comparative examples 1 and 2 were individually added into the quartz reaction vessel containing 100 mL of deionized water, and then 0.05 mol of $9H_2O \; Na_2S$ and 0.05 mol of $Na_2SO_3$ was added as a sacrificial agent to provide enough electrons for photocatalytic water splitting, thus promoting the redox reaction of water splitting; and nitrogen was introduced into the reaction vessel to vent the gases therein to prevent the gases in the solution system from influencing the subsequent experiment.

(2) The nitrogen tank was switched on to provide carrier gas protection for the entire hydrogen production system. Subsequently, the gas chromatograph and the photocatalytic hydrogen production system were started, and the matched software in the computer was opened; and the program in the matched software was set to hydrogen production and the coil of the gas chromatograph was heated.

(3) The cooling water pipeline of the reaction vessel was connected, then the preset temperature of the cooling water was set to 5° C., and then cooling water circulation was turned on; vacuum grease was evenly applied on the joint of the reaction vessel and the quartz pipeline of the photocatalytic hydrogen production system, and then the vacuum pump was turned on to vacuumize the system until the approximate pressure was near 1.3 kPa.

(4) The valves of the photocatalytic hydrogen production system were rotated, and the vacuum pump was turned off after the pressure inside the system was stabilized; the jump pump was turned on, which is beneficial for homogeneously stirring the produced hydrogen, and convenient for the gas chromatograph to detect accurately.

(5) The xenon lamp was preheated for 2 minutes, and then was turned on; and an ultraviolet cutoff filter was installed. The period of detecting hydrogen of the photocatalytic hydrogen production was set as 1 h (i.e., the gas chromatograph detects the content of hydrogen in the system once every one hour); simultaneously, the circulation cycle was set as 12. and the cumulative hydrogen production (shown in FIG. 4) and the average hydrogen production rate (shown in FIG. 5 below) during the circulation period in the photocatalytic hydrogen production experiment were recorded.

Figure 4:
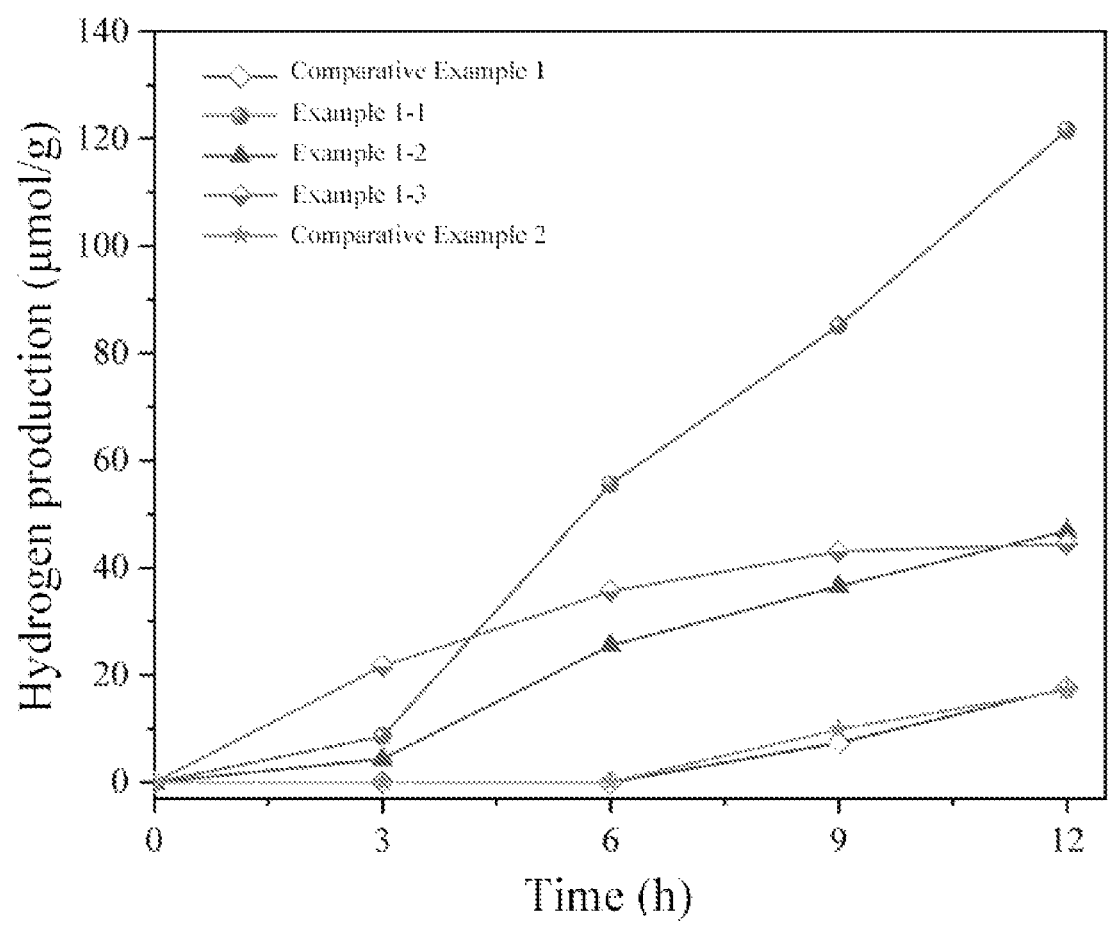
FIG. 4 illustrates cumulative hydrogen production of photocatalytic hydrogen production experiments under the catalysis of photocatalysts of Example 1 of the present disclosure, Comparative Example 1 and Comparative Example 2, respectively.
Figure 5:
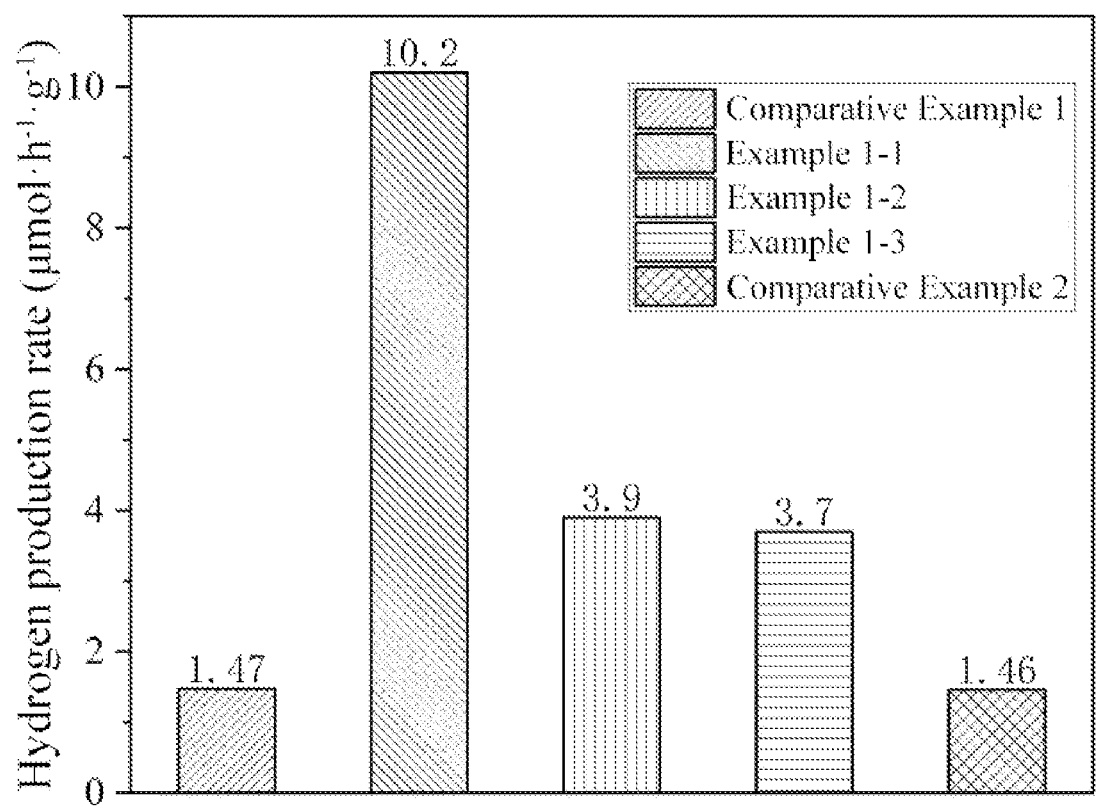
FIG. 5 shows average hydrogen production rate in the photocatalytic hydrogen production experiments under the catalysis of photocatalysts of Example 1 of the present disclosure, Comparative Example 1 and Comparative Example 2, respectively.

FIG. 4 illustrates cumulative hydrogen production of the photocatalytic hydrogen production experiments under the catalysis of photocatalysts of Example 1, Comparative Example 1 and Comparative Example 2, respectively; and FIG. 5 shows average hydrogen production rate of the photocatalytic hydrogen production experiments under the catalysis of photocatalysts of Example 1, Comparative Example 1 and Comparative Example 2, respectively. As can be learned from FIGS. 4 and 5, the hydrogen production rate of the SiC photocatalyst of Comparative Example 1 was 1.47 mol·h$^{-1}$·g$^{-1}$ when the UV light was filtered out; whereas the hydrogen production rate of the SiC-loaded graphene photocatalyst of Example 1-1 was 10.2 μmol·h$^{-1}$·g$^{-1}$ under the same condition, which was an enhancement by 6.9 times. As a comparison, the hydrogen production rate of Example 1-2 and Example 1-3 were 3.9 μmol·h$^{-1}$·g$^{-1}$ and 3.7 μmol·h$^{-1}$·g$^{-1}$, respectively. And in this scheme, the optimized hydrogen production rate was obtained when the mixing ratio of the pure black carbon and the pure SiC was 1:4.

The composite photocatalyst of Comparative Example 2 was subjected to photocatalytic water splitting under the same experimental conditions as the other photocatalysts mentioned above. And the obtained hydrogen production rate was only 1.46 $\mu mol \cdot h^{-1} \cdot g^{-1}$, which was close to that of Comparative Example 1, indicating that the simple mixing of black carbon and SiC could hardly help the hydrogen production. However, the hydrogen production rate of the mixture of the black carbon and the SiC processed by the current pulse equipment was significantly improved. It might be due to the fact that the black carbon was processed to form graphene, and then an interfacial effect was formed between graphene and SiC, i.e., a heterojunction was formed, which was beneficial for carrier separation and thus enhanced the catalytic efficiency. On the other hand, since SiC was loaded on the layered graphene, and due to the large specific surface area and the high carrier mobility of the graphene, the carrier mobility of SiC was facilitated higher during the catalytic reaction, reducing the possibility of carrier recombination and increasing the catalytic activity of the composite photocatalyst.

The technical mechanism of this application has been described above with reference to embodiments. These descriptions are only intended to explain the mechanism of this application and should not be construed in any way as a limitation to the protection scope of this application. It should be noted that other embodiments obtained by those skilled in the art based on the content disclosed herein without making creative effort shall fall within the scope of this application defined by the appended claims.

What is claimed is:

1. A method for preparing a silicon carbide (SiC)-loaded graphene photocatalyst for hydrogen production under visible light irradiation, comprising:
    step (A) preparing a pure SiC;
    step (B) preparing a pure black carbon;
    step (C) mixing the pure SiC and the pure black carbon to obtain a mixture, wherein the mixture has a resistance less than 100 $\Omega$;
    step (D) feeding the mixture to a current pulse processing equipment; and vacuumizing the current pulse processing equipment, and processing the mixture with a current pulse with an increasing voltage until a breakdown of the mixture occurs, wherein the current pulse has a capacitance of 70-80 mF and a voltage of 120-180 V; and
    step (E) subjecting the mixture to ultrasonic stirring, centrifugal washing and vacuum drying in turn to obtain the SiC-loaded graphene photocatalyst.

2. The method of claim 1, wherein step (A) comprises:
    step (A1) calcining SiC powder followed by natural cooling to room temperature;
    step (A2) immersing the SiC powder obtained in step (A1) with a HF (Hydrogen Fluoride) solution under a sealed and light-proof condition; and
    step (A3) filtering an immersion system obtained in step (A2) to collect a filter residue; and subjecting the filter residue to washing with deionized water and vacuum drying to obtain the pure SiC.

3. The method of claim 2, wherein in step (A1), the SiC powder is calcined at 600-900° C. for 3-4 h;
    in step (A2), the HF solution has a HF content of 1-5% by weight; and
    in step (A3), the vacuum drying is performed at 50-90° C. for 3-4 h.

4. The method of claim 1, wherein step (B) comprises:
    calcining black carbon powder followed by natural cooling to room temperature to obtain the pure black carbon.

5. The method of claim 4, wherein the black carbon powder is calcined at 200-300° C. for 3-4 h.

6. The method of claim 1, wherein in step (E), the ultrasonic stirring is performed at 40-60° C. for 20-60 min.

7. The method of claim 1, wherein in step (E), the centrifugal washing is performed at 500-800 r/min for 30-40 min.

8. The method of claim 1, wherein in step (E), the vacuum drying is performed at 60-80° C. for 3-4 h.

9. A SiC-loaded graphene photocatalyst prepared by the method of claim 1 for hydrogen production under visible light irradiation.

* * * * *